United States Patent
Pinkas et al.

(10) Patent No.: US 7,240,198 B1
(45) Date of Patent: Jul. 3, 2007

(54) HONESTY PRESERVING NEGOTIATION AND COMPUTATION

(75) Inventors: Binyamin Pinkas, Jersey City, NJ (US); Simeon Naor, Tel Aviv (IL)

(73) Assignee: Yeda Research & Development Co., Ltd., Rehovot (IL)

( * ) Notice: Subject to any disclaimer, the term of this patent is extended or adjusted under 35 U.S.C. 154(b) by 863 days.

(21) Appl. No.: 09/807,099

(22) PCT Filed: Aug. 8, 2000

(86) PCT No.: PCT/US00/21615

§ 371 (c)(1),
(2), (4) Date: Apr. 9, 2001

(87) PCT Pub. No.: WO01/11527

PCT Pub. Date: Feb. 15, 2001

(51) Int. Cl.
*H04L 9/00* (2006.01)
*H04L 9/32* (2006.01)
(52) U.S. Cl. .......................... 713/168; 713/170; 726/2
(58) Field of Classification Search ................ 713/170, 713/168; 705/37, 80, 74; 726/2
See application file for complete search history.

(56) References Cited

U.S. PATENT DOCUMENTS

| | | | | |
|---|---|---|---|---|
| 5,905,975 A | * | 5/1999 | Ausubel | 705/37 |
| 6,021,398 A | * | 2/2000 | Ausubel | 705/37 |
| 6,026,163 A | * | 2/2000 | Micali | 705/80 |
| 6,026,383 A | * | 2/2000 | Ausubel | 705/37 |
| 6,030,288 A | * | 2/2000 | Davis et al. | 463/29 |
| 6,055,508 A | * | 4/2000 | Naor et al. | 705/11 |
| 6,055,518 A | * | 4/2000 | Franklin et al. | 705/37 |
| 6,165,072 A | * | 12/2000 | Davis et al. | 463/29 |
| 6,285,989 B1 | * | 9/2001 | Shoham | 705/37 |
| 6,834,272 B1 | * | 12/2004 | Naor et al. | 705/80 |
| 2004/0039685 A1 | * | 2/2004 | Hambrecht et al. | 705/37 |

* cited by examiner

*Primary Examiner*—Hosuk Song
(74) *Attorney, Agent, or Firm*—Martin Fleit; Paul D. Bianco; Fleit Kain Gibbons Gutman Bongini & Bianco, P.L.

(57) ABSTRACT

A method and system for preserving the integrity of a negotiation that includes providing an architecture which includes a center A, and a plurality of users $B_1, B_2, \ldots, B_n$. each user $B_i$ generates an input $X_i$, which is input to the center A. The center A computes and publishes a function $F(X_1, X_2, \ldots, X_n)$ based on the input messages it receives. Each user $B_i$ ($1 \leq i \leq n$) communicates with the center A, exclusively. Center A publishes additional information which lets each of the users verify that F was computed correctly, and prevents a coalition of any one subset of the users from learning anything which cannot be computed just from the output of the function, $F(X_1, \ldots, X_n)$, and from their own inputs, or information about the inputs of other users.

9 Claims, 6 Drawing Sheets

HONESTY PRESERVING NEGOTIATION AND COMPUTATION

BACKGROUND OF THE INVENTION

1. Field of the Invention

This invention relates generally to cryptography and to secure distributed computation, and more particularly it relates to computerized auctions conducted using PCs and/or servers over a network, such as, the Internet.

2. Description of the Prior Art

An exciting topic of cryptographic research is secure function evaluation [see e.g. REFERENCES 3, 7, the citations for which are given in detail at the end of the specification]. For any function $F(x.sub.1, x.sub.2, \ldots, x.sub.n)$, it is possible, in principle, to construct a protocol that allows a group of n parties, where party i has as its private input $x.sub.i$, to jointly evaluate $F(x.sub.1, x.sub.2, \ldots, x.sub.n)$. Following the protocol the parties learn $F(x.sub.1, x.sub.2, \ldots, x.sub.n)$ but no party i can learn about the inputs other than $x.sub.i$ more than can be computed from $x.sub.i$ and $F(x.sub.1, x.sub.2, \ldots, x.sub.n)$. The drawback of these protocols is that they are rather complex and require a lot of interaction between each of the parties. In the case of auctions this would require high interaction between the bidders, who have no motivation to interact with each other. The present invention, as will be described in greater detail in the following, provides a much simpler method in which all the parties communicate with just a single center. In the inventive method described hereinafter, the input of each of the parties becomes known to this center but otherwise, it is not known to any other party. The inventive method enables the center to prove that it preformed the computation correctly.

In the case of auctions, it is normally the case that the auctioneer is trusted by all parties to compute the result of the auction correctly. This might not be justified, since the auctioneer might benefit from an illegal modification of the result of the auction. (This is even true if the auctioneer is just a mediator that is selling items which are offered by third parties, since such auctioneers usually charge a commission which depends on the price with which the items are sold). It is sometimes the case that a trusted party (say an accountant) observes the operation of the auctioneer and testifies that it is trustworthy. However this party might be corrupted and cooperate with a corrupted auctioneer, it might also be the case that the trusted party cannot watch the auctioneer closely enough and the auctioneer can cheat without being detected. These problems are amplified in a computerized Internet setting.

The center that computes F can of course prove that it computed it correctly by publishing all the inputs. However this solution affects the privacy of the other parties, since their inputs become public. The inventive method overcomes this problem since it enables the center to prove that it computed F correctly without is leaking any information about the inputs.

There are suggestions in the art for distributing the operation of an auctioneer between many servers in a way which is secure as long as not too many of these servers operate maliciously. Franklin and Reiter [see REFERENCE 2] developed a distributed system for sealed-bid auctions with many auctioneer servers, which ensures the privacy of the bids until the time they are opened. This system further enables the bids to be backed by escrowing financial commitments of the bidders. Harakavy, Tygar, and Kikuchi [see REFERENCE 4] present systems for secure first price and second price sealed bid auctions, which preserve the privacy of the bids even after the winning bid is chosen (this variant was also briefly mentioned in REFERENCE 2). Both systems distribute the operation of the auctioneer between several servers and privacy is guaranteed as long as not too many of the servers collude (most of the protocols require that less than a third of the servers collude, and therefore, need a minimum of four servers). However, if enough auctioneer servers collude they are able to maliciously change the outcome of the auction and would not be detected. The requirement that auctioneer servers would not collude seems very hard to enforce since all these servers operate for the auctioneer which might have a motivation to cheat and increase its profits. Compared to these prior art solutions, the inventive method does not require to distributing the operation of the auctioneer among several non-colluding servers, and provides security even if the auctioneer is attempting to cheat.

Naor and Pinkas [see REFERENCE 6] present a different method that prevents even the center from learning information about the parties' inputs. That method requires the operation of an additional party—the Issuer. The Issuer generates a program that computes the function (or the auction) and sends it to the center. The center receives messages from the parties, which contain some information that is intended for the Issuer: After the center receives messages from all the parties it sends a message to the Issuer and receives a response which enables it to use the program to compute the output of F for the parties' inputs. The method ensures that neither the center nor the Issuer learn information about the inputs of the parties. In this sense it provides better privacy than the inventive method described herein. However, the inventive method presented here does not require the cooperation of any additional party (like the Issuer) for the computation of F. It enables the center to compute the function by itself and prove that it computed it correctly, and in this respect is an advantage.

SUMMARY OF THE INVENTION

Consider a scenario with N parties, each having a private input, and a single center. There is a function F with N inputs whose output should be computed. Each party sends its input to the center. The present invention is a method, system and apparatus that enables the center to compute and publish the output of F and to prove to all parties that it computed F correctly. This is done without revealing the value of the input of a party to any other party.

More specifically, the parties can be bidders in an auction, their inputs are their bids, the center is the auctioneer, and the program F expresses the rule by which the outcome of the auction is decided. The invention requires the auctioneer to prove that it computed the result of the auction correctly.

The invention provides the same security as in the following scenario: Assume that there is a reliable party (say an accountant or a lawyer) which is trusted by all other parties. This party observes the operation of the center, i.e. it examines the inputs that the center receives, verifies that the center computes the correct output, and testifies that this is the case. The invention provides the same security as is provided with this trusted party, but without using any such party. This ensures better security (since trusted parties might breach the trust they are given), and is more efficient (since it does not require an additional party).

Other and further advantages and objects of the present invention will become readily apparent when considering the following detailed description of the present invention when taken together with the appended drawings.

DETAILED DESCRIPTION OF PREFERRED EMBODIMENTS

As initially noted, the apparatus and method of the present invention comprises an auction service that is used in a network, such as, the Internet, and uses clients and/or servers. The invention utilizes cryptography and secure distributed computation via computers to effect a computerized auction. However, the invention is not limited to computerized auctions, but has broader application. Many such applications involve a group of participants, denoted herein as "Parties", each of whom has an input to the group as a whole, where the group as a whole is required to compute and output a certain function of these inputs. The term "function" herein denotes, in the usual sense, any mathematical or logical mapping from one set of input entities to an output entity or set of entities. In certain cases, the inputs may involve sensitive information, such that it would also be required that this computation does not reveal any information about the inputs, except for whatever might be computed from the final output. Such inputs are herein denoted as "private inputs". If, in addition to the parties, there were furthermore a trustworthy participant, denoted herein as a "center" and which is trusted by all the parties, then each party could simply send the respective private input to this center, which would then compute the function and publish, or output, the value of the computed function. (The center is a participant in the protocol and is involved in the computation of the function. It may or may not have a private input, and may or may not be within the group of parties.) The parties, however, might not trust each other, and might not trust any single center.

Although a particular case of interest is that of auctions, for example, sealed-bid second-price auctions, commonly known in the art as "Vickrey auctions", other applicable activities include mechanism design, which deals with the design of protocols for selfish parties. The goal of a protocol is to aggregate the preferences of the parties in order to decide on some social choice (for example, to decide whether a community should build a bridge, or how to route packets in a network, or to decide who wins an auction). Each party has a utility function which expresses how much that party values each possible outcome of the protocol (the bid in an auction, for example, is such a utility function). Each party sends information about its utility function to a center, which decides on the outcome of the protocol based on the reports from the parties, according to a specified function of the utility functions (for example, in a sealed-bid auction, the specified function that determines the winner is the maximum of the bids). The creation of algorithms by mechanism design is known in the art, to solve a global problem among a number of selfish agents (e.g. routing, or some cooperation between the agents). The present invention can be used to compute these algorithms without requiring trust in the center. The plausibility of using the present invention for such a task depends on the complexity of expressing the utility functions and decision procedure in terms of circuits.

A particular case of interest is the Groves-Clarke mechanism, where the public good is served if the sum of reported values is higher than some threshold. The circuit which computes this function is very simple, as is the circuit which computes the sum of the reported values for several options, and decides on the option with the highest sum. It is therefore very easy to use the present invention to provide a private protocol which computes a Groves-Clarke mechanism.

Opinion polling is another relevant application. The design of mechanisms to elicit opinions of a group of independent experts. The application enables parties to contribute their opinion to a decision making without being worried that their opinion would be revealed. It is known in the art that where experts want their recommendation to be accepted, that there exists a mechanism with a single equilibrium which achieves the public target (but such a mechanism does not exist if experts care only about the public good). Such a mechanism can be implemented very efficiently by the present invention. This essentially requires that one expert chooses a subset of the experts whose opinions are considered, learns their opinions, and then adds his opinion. The group decision is the majority opinion.

Another application is for polling the opinions of a group of people, while hiding the individual opinions of the participants. Consider for example an opinion poll (such as the Gallup Poll) which contains many questions. Suppose that the poll is anonymous, and the organizer obtains lists of answers, one list for each participant. In order to prove that it computed the result correctly, the organizer must publish the lists of answers. Suppose also that only a single participant answered affirmatively to a certain question, and that it is possible to guess with very high probability who this participant is. Then, although the answers are anonymous, it is possible to learn the answers of this participant to all the questions. The present invention enables the sending of questions to the group members, and the processing of their answers to obtain commutative outputs without revealing any information about individual answers. Additional applications of the present invention include multiple-question opinion polls, sociometric research, and voting and elections.

Stable matching is yet another example of a global decision which depends on the private preferences of many parties. In many scenarios it is plausible that parties would be hesitant to reveal their matching preferences, even to the center that computes the matching (consider, for example, matching couples for a prom). The present invention enables the parties to reveal their true preferences without being afraid that the center can learn them. As with other applications, the overhead of implementing the present invention for this application depends on the complexity of expressing the matching algorithm as a combinatorial circuit.

Figure 1:
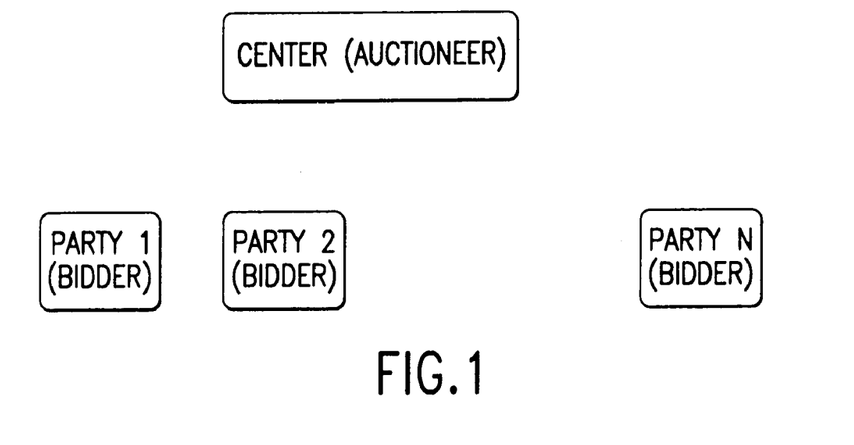
FIG. 1 is a block diagram illustrating the different entities engaged in a computerized auction.

Referring now to the drawing, the different entities are depicted in FIG. 1. As shown, the entities include The parties 320 and the Center 321. Each of the parties 320 has an input to the function F. In the case of auctions some of the parties might wish to sell items, and the rest of the parties are interested in buying these items. In addition to the parties 320, there is a center 321. The center 321 runs the show: it advertises the fact that F is computed, receives the inputs, and performs the computation. In the case of auctions, the center is the auctioneer. It publishes the auction, receives the bids from the bidders, and computes the outcome of the auction. The auctioneer might be a party which merely organizes the auction. It is also possible that it is one of the bidders or one of the sellers (for example he is selling an item which all other bidders are interested in buying).

Figure 2:
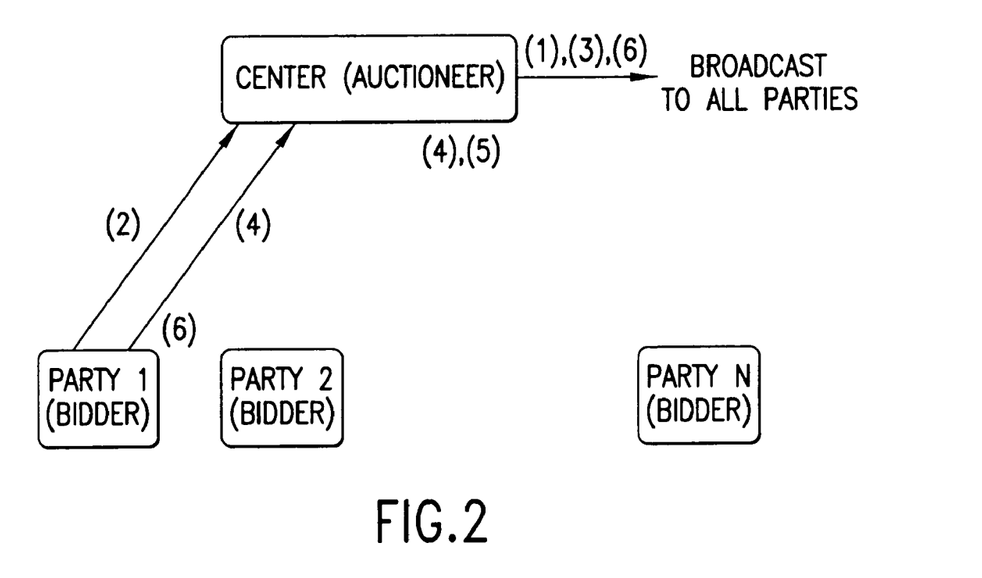
FIG. 2 is a schematic diagram illustrating the steps of the method of the present invention where the steps are indicated by numerals in parentheses.

The Steps in a high level description of a preferred embodiment are illustrated in FIG. 2. The high level description of the illustrated preferred embodiment of the method involves the following sequence of steps of the protocol. The Steps include the following sequence. (1) The center announces the computation and commits to the circuits. (2) Party 1 sends a commitment to its input (Party 1 represents a generic party, and this operation is performed by each of the participating parties). (3) The center publishes the commitments. (4) Party 1 opens its commitment, and the center verifies it. (5) The center computes' the function. (6) The center publishes a proof that the computation was correct, and Party 1 verifies it.

Figure 3:
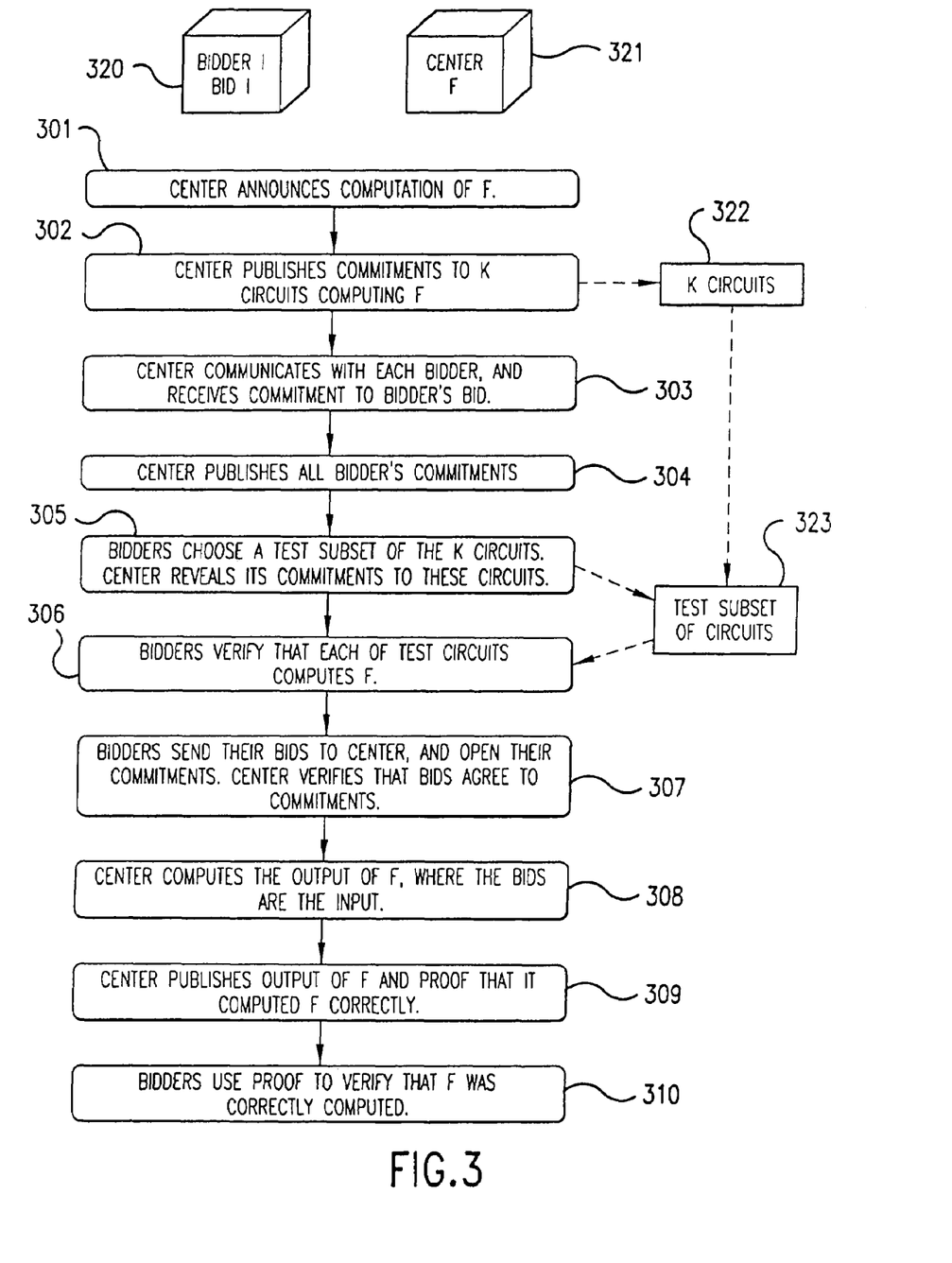
FIG. 3 is a high level descriptive flow chart of the present invention as generally depicted in the diagrams of FIGS. 1 and 2.

The Steps of the method of the present invention are elaborated in more detail in the following, with reference to FIG. 3. As shown, there are a number of bidders 320 and a single center 321. The center announces Step 301 that it will compute the function F. (In the case of an auction the auctioneer announces the existence of the auction and publishes its rules). The center publishes in Step 302 commitments to K combinatorial circuits 322 that compute F (where K is a security parameter).

Party $B_i$, which wishes to participate in computing the function F, sends a message to the center. They might exchange several rounds of communication, Step 303, at the end of which the center has a commitment $c_i$ to the value of $B_i$'s input $x_i$.

The center publishes in Step 304 the commitments it received from the parties. (In the case of auctions this can be done at the end of the bidding period).

In Step 305 the bidders choose part of the K circuits that the center committed to, from block 323, and ask the center to open them. They verify in Step 306 that the circuits compute the function F. In Step 307 each party $B_i$ sends to the center the value $x_i$ to which it committed with $c_i$. The center verifies that $x_i$ corresponds to $c_i$, that is it verifies that $A(x_i, c_i)=1$.

The center now computes in Step 308 the value of the circuit that computes F for the inputs $x_i$ it received. Next, the procedure for verifying the computation takes place. The center computes and publishes a proof in Step 309 that it computed the value of F correctly. Each party can use the published commitments to verify in Step 310 that the proof is correct.

A considerable improvement to the protocol can be achieved by noting that the function that is computed by the circuit need not be the function F that the center computes, and woe computation should be verified. The circuit can compute a function F' that verifies that F was computed correctly. For example, if F is a function that computes the value and the index of the maximum of N inputs, $X(1), \ldots, X(N)$, F' is the following function: It has N+2 inputs comprised of the N inputs to F and the outputs (j,Y) of F. F' outputs 1 if and only if $X(j)=Y$, and $X(j)>=X(i)$ for every i different from j. The circuit that computes this function is substantially more efficient that the circuit computing F.

There now is elaborated a detailed description of the preferred embodiment. The inventive method employs cryptographic tools that enable a secure two-party function evaluation. The particular secure two-party function evaluation protocol used in the present invention is based on the method disclosed in REFERENCE 7. In the invention, the protocol is run between two participants, A and B. The input of A is a value x and the input of B is a description of a function f. At the end of the protocol, A learns f(x) (but no other information about f), and B learns nothing about x. Thus, the input x is a private input of A, and the function f is a private input of B.

The protocol is based on expressing f as a combinatorial circuit of gates which are over some fixed base (e.g. all the functions g: 0,1 times 0,1 to 0,1). The bits of the input are entered into input wires and are propagated through the gates.

This procedure encrypts a circuit by generating a pseudo-random isomorphic transformation of the circuit. This encryption is herein referred to as a "garbling" of the circuit. The cyphertext of a circuit so encrypted by this procedure is herein denoted as a "garbled" circuit. This process is detailed below, with reference to FIG. 5.

Figure 5:
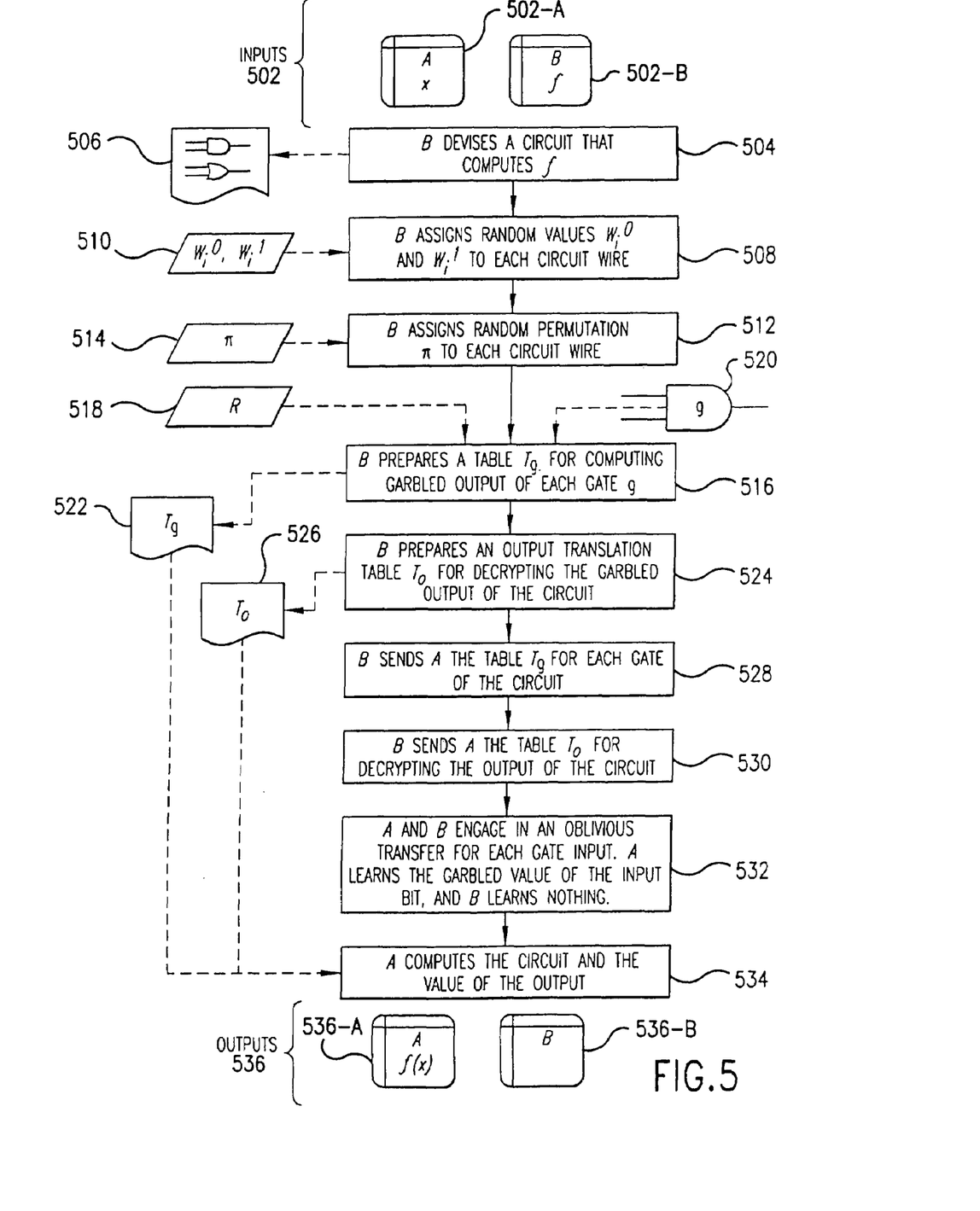
FIG. 5 is a flow chart of a secure two-party function evaluation protocol as implemented by the present invention.

As shown in FIG. 5, Inputs 502 include: A: a value x, in an input 502-A, and B: a description of a combinatorial circuit which computes f, in an input 502-B. The outputs of the flowchart shown in FIG. 5 are Outputs 536 that include: A: f(x), in an output 536-A, and B: nothing, in an output 536-B.

The protocol starts with Initialization. In step 504, B devises a circuit 506 made of logic gates, such that circuit 506 computes f. The design of logic circuits made of gates that compute functions is well-known in the art.

Next, the circuit is encrypted. In step 508, B assigns to each wire i of circuit 506 two random values $(W_i^0, W_i^1)$ 510 corresponding to 0 and 1 values of wire i. The random values should be long enough to be used as keys (for example, 80 bits long). The value of wire i is denoted by $b_i$. In step 512, B also assigns to wire i a random permutation $\pi$ 514 over 0,1, $\pi_k: b_i \to c_i$.

In step 516, B uses a pseudo-random function R 518 to prepare a table $T_g$ 522 (or a set of tables, also denoted herein by $T_g$) which enables computation of the garbled output of each gate g 520, $(W_k^{b_k}, c_k)$, from the values $(W_i^{b_i}, c_i)$, $(W_j^{b_j}, c_j)$, the garbled inputs to gate g. Table $T_g$ does not disclose any information about the output of gate g for inputs other than the pair $(b_i, b_j)$, nor discloses the values of the bits $b_i$, $b_j$, or $b_k$.

In step 524, B prepares an output translation table $T_O$ 526 which decrypts the garbled output bits of the circuit (the cyphertext output) to the actual bits of the output of the circuit (the cleartext output).

Figure 6:
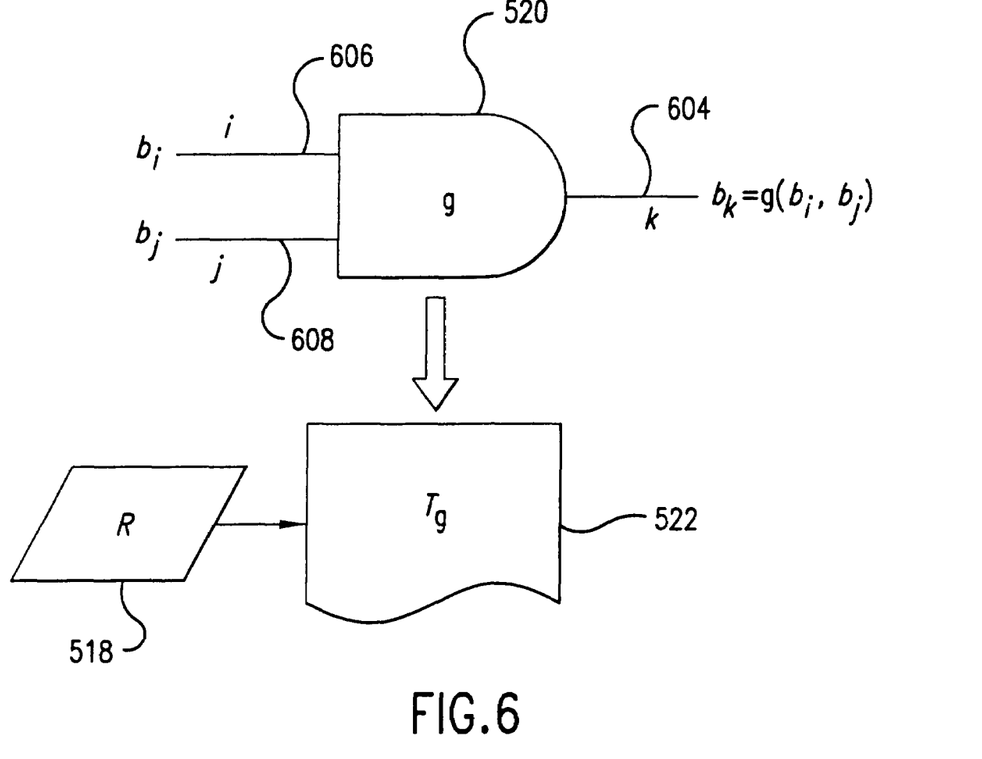
FIG. 6 is a schematic diagram of a gate used in the protocol depicted in FIG. 5, and also shows the pseudorandom function used to prepare Table $T_g$ used in the protocol of depicted in FIG. 5.

FIG. 6 illustrates gate g 520, which is a generic gate that computes the value $b_k$ of an output wire k 604 as a function of the values $b_i$, and $b_j$ of input wires i 606 and j 608, respectively. Such a computation is denoted as $b_k=g(b_i, b_j)$. FIG. 6 also illustrates pseudo-random function R 518, which is used to prepare table $T_g$ 522.

If one assumes initially that the fan-out of every gate is 1, table $T_g$ contains four entries of the form:

$$c_i, c_j: (W_k^{g(b_i, b_j)}, c_k) \text{ XOR } R_{W_i}^{b_i}(c_j) \text{ XOR } R_{W_j}^{b_j}(c_i),$$

where $0 \leq i \leq j \leq 1$.

The value $c_k$ is given by $c_k = \pi_k(b_k) = \pi_k(g(b_i, b_j))$. The entry does not have to include the index $c_i$, $c_j$ since this is implicit in the entry's location.

Assume that A knows $c_i$, $c_j$ and the values $W_i^{b_i}$, $W_j^{b_j}$. In order to compute a gate, A finds the entry $c_i$, $c_j$ in the table $T_g$ for that gate, and performs an XOR (exclusive-OR) operation with the value $R_{W_i}^{b_i}(c_j)$ XOR $R_{W_j}^{b_j}(c_i)$ to get the value $W_k^{b_k} = W_k^{g(b_i, b_j)}$, and of $c_k$.

To code the Input the following is undertaken. Given the table $T_g$ of the gates, and the garbled values $W_i^{b_i}$ and $c_i$ which correspond to the input wires, it is easy to compute the garbled values of the output wires of the circuit. A knows the values of the input bits and should obtain the values of the corresponding wires. In step 528, for each gate in circuit 506, B sends to A the table $T_g$ 522 that codes the gate. In step 530, B sends to A the table $T_O$ 526 that decrypts the garbled values of the output of the circuit the output bits of the circuit. In step 532, for each gate input wire in the circuit, A and B engage in an Oblivious Transfer, at the end of which A learns the garbled value of the wire's input bit (but nothing about the garbled value of the input bit of the other wire into the gate), and B learns nothing.

A now has enough information to compute the circuit. In step 534, A computes the output of the circuit for the input x. However, since A does not know the garbled values for any other input bits, A cannot compute information about $f(x_0)$ for any $x_0 \neq x$ (except, of course, information that can be deduced from $f(x)$ alone). Note that the communication between the two participants A and B can be done in a single back-and-forth round, and B can prepare the circuit in advance, before the input is known to A.

To handle a gate fan-out greater than 1, it is simply required to use a different input to the pseudo-random function R at each gate in which the wire is used. (If the same value be used in different gates, then it will be possible to cancel the application of the pseudo-random function R by an XOR operation, and A could thereby learn relationships between garbled values.) Suppose that the fan-out of wire i is M, then in a gate m ($1 \leq m \leq M$) which uses wire i as input, the masking value that is used should be $R_{W_i}^{b_i}(c_j, m)$. That is, the pseudo-random function R should be applied to the concatenation of $c_j$ and m. Alternatively, it is possible to assign each gate a unique identifier $I_g$, and use $R_{W_i}^{b_i}(c_j, I_g)$.

It is also possible to adapt this protocol to circuits in which gates have more than two inputs, as well as, for wires having more than two possible values. The size of the table for a gate with n inputs which each can have d values is $d^n$.

The prior art of REFERENCE 7 (Yao's protocol) is limited to two participants, but has been extended has been extended in the prior art to handle multi-party inputs, see REFERENCE 3. These extended protocols, however, require a round of communication for each gate in the circuit, which is impractical in many applications, such as in auctions. The method of REFERENCE 3 would require extensive interactive communication among the bidders in an auction, and is therefore not suitable. In contrast, the present invention does not impose the burden of extensive interactive communication and does not require the bidders to communicate among themselves, and therefore represents an improvement not only over the prior art of REFERENCE 7 and 3. Furthermore, the prior art of REFERENCE 3 is secure only for limited coalitions of less than one-third of the parties.

A commitment to a value X is similar to the following process: party B which knows the value of X writes it on a piece of paper which is put in a sealed envelope. At this stage no one can learn anything about X, but B is committed to X and cannot change the value in the envelope. At a later stage B can "open the commitment" by opening the envelope and revealing X.

More formally, a commitment to a value X is computed by a function $C = C(X,R)$, where R is a random string. It has the following properties: (1) C is easy to compute. (2) Given $C(X,R)$, it is infeasible to compute any information about X. (3) There is an algorithm A such that $A(C(X,R),X,R) = 1$, and for any other X' (different than X) and R' it holds with high probability that $A(C(X,R),X',R') = 0$. Such commitments schemes can be implemented efficiently, see for ex-ample REFERENCE 5.

Figure 4A:
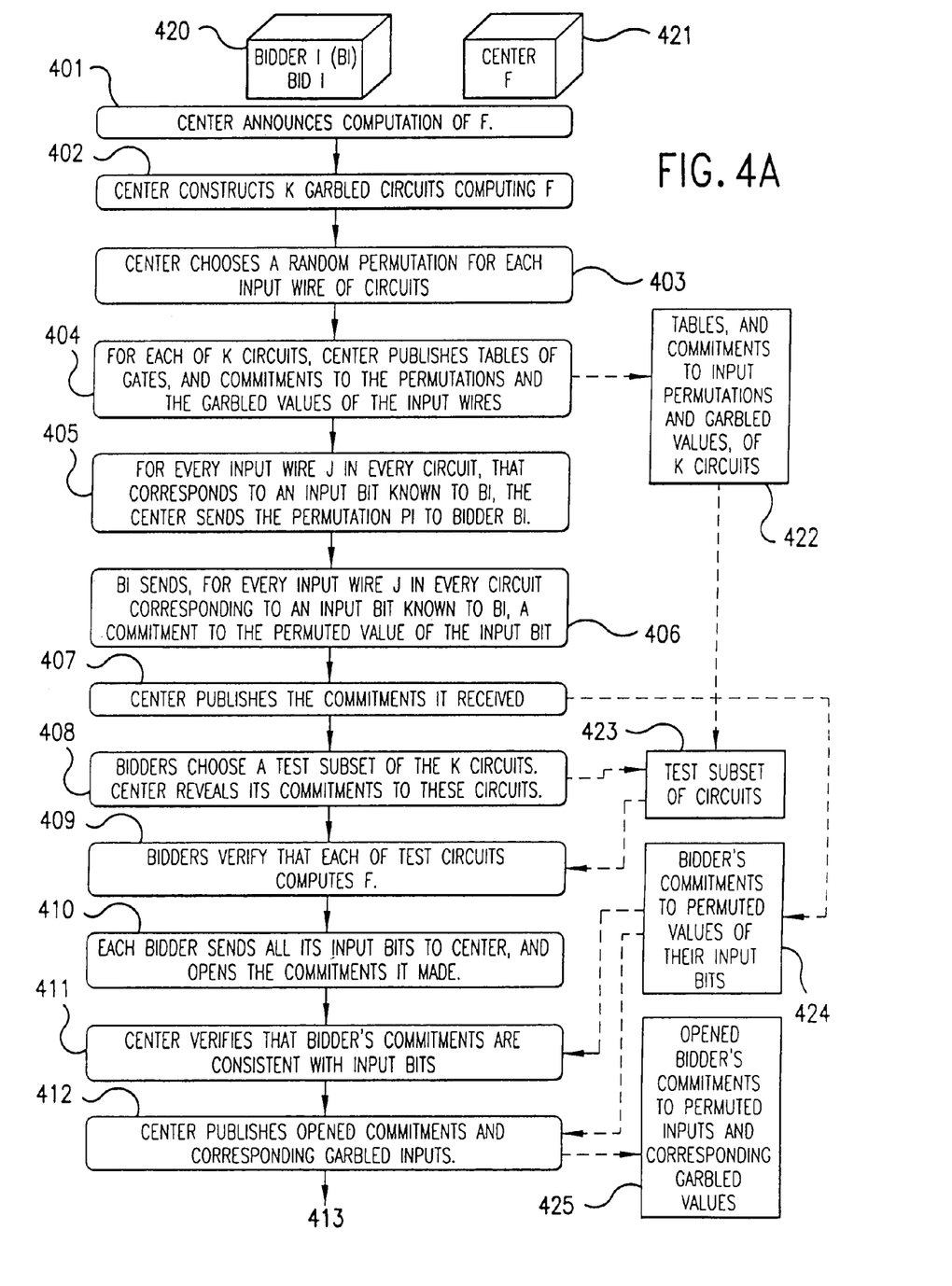
FIG. 4 is a flow chart showing the steps of the implementation of the preferred embodiment of the present invention.
Figure 4B:
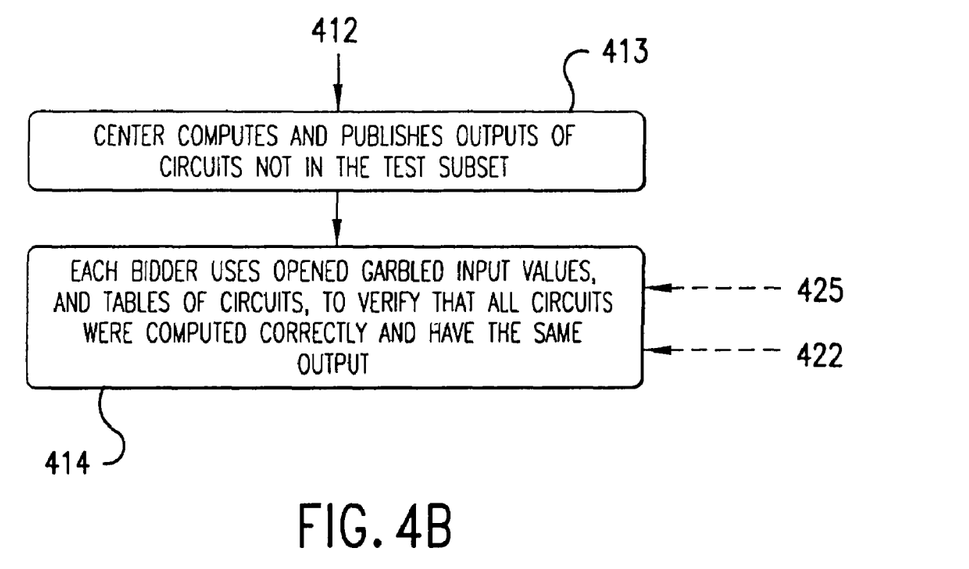

Now the details of the implementation of the preferred embodiment will be described in conjunction with the flow chart of FIG. 4. The first stage is the announcement. This stage is carried out by the center 421 announcing in step 401 that it will compute F. Let K be a security parameter. The center constructs in step 402 K garbled circuits that compute F. For each input wire j of each of the circuits the center chooses in step 403 a random permutation P.sub.j over the two values 0 and 1. The center publishes in step 404 the tables of the gates of the K circuits 422. For each input wire j (in each of the circuits) it publishes in step 404 a commitment to W.sub.j.sup.0 and a commitment to W.sub.j.sup.1, ordered by the permutation P.sub.j, and a commitment to P.sub.j.

The next stage is for the parties 420 to commit to their inputs. Each party B.sub.i has an input x.sub.i of I bits. The bits of this input are denoted as x.sub.(i,I)). Each input bit should be input to an input wire in each of the K circuits. For each wire j of these wires, the center sends in step 405 to B.sub.i, the permutation P.sub.j. B.sub.i sends in response in step 406 a commitment 424 to P.sub.j(x.sub.(i,I)), i.e. to the permuted value of its input.

The next stage is to publish the commitments. The center 421 publishes in step 407 the commitments 424 it received from the parties.

The next stage is to open the commitments. The parties 420 choose K/2 of the K circuits that the center has created and ask the center to open in step 408 all the commitments to the permutations and garbled inputs of these K/2 circuits 423. They verify in step 409 that these circuits indeed compute F. Each of the parties B.sub.i sends in step 410 its input x.sub.i to the center. B.sub.i also opens to the center the commitments that it made to each of its assigned input wires. These were for values 0 or 1 which are the permuted values of B.sub.i's inputs. The center verifies in step 411 that these commitments are consistent. The center publishes in step 412 the opened commitments 425 of each of the parties, and opens the garbled values W.sub.j.sup.0 or W.sub.j.sup.1 that correspond to them.

In the next stage, the center computes the function in step 413 and publishes the output of each of the K/2 circuits which were not chosen by the parties.

In the final stage, each party 420 can verify the computations of the center 421. Each B.sub.i can use the opened garbled values 425 and the tables of the gates 422 to compute the output of each of the K/2 circuits, and verify in step 414 that they all have the same output.

One problem that may be encountered in an auction is that a party does not open its commitment. For example, a party might refuse to communicate with the sender at the step at which the commitments should be open. This type of behavior enables cheating, for example, in the case of second price auctions the center itself might use fake identities of bidders in order to commit to bids in different values, and open only the bids which are smaller than the highest value among all other bids. This behavior might increase the amount that the winner would be required to pay.

One approach for dealing with parties that do not open their commitments appropriately would be to require parties to also submit their bids to a trusted third party T. The help of the trusted party T is not required, if all parties open their commitments. However, when a party refuses to open its commitment, the trusted party T can be called upon to open it. Such a scheme can be realized, for example, by using commitments of the following form: the public key of trusted party T would be known to everyone. A commitment to a value v would be an encryption of this value with T's public key (say with a probabilistic encryption scheme which ensures indistinguishability). The party who created this commitment can open it by revealing v and showing how it encrypted it. If this party refuses to open the commitment then trusted party T can open it using its private key.

A more promising approach is to use "Timed commitments" [see REFERENCE 8]. These are commitment schemes with an optional forced opening phase enabling the receiver of the commitment to recover (with effort) the committed value without the help of the bidder making the commitment (committor). It is possible to require the bidders to use timed commitment schemes to commit to their bids, enabling the auctioneer to open these commitments, to their original value, if a bidder is not willing to open his or her bid.

A different approach for ensuring that each party opens its commitments is to require parties to back their commitments financially. A party who refuses to open its commitment would be required to pay a fine.

REFERENCES

[1] M. Bellare and S. Micali, Non-interactive oblivious transfer and applications, Proc. Advances in Cryptology—Crypto '89, Springer-Verlag LNCS 435 (1990), 547–557.

[2] M. K. Franklin and M. K. Reiter, "The design and implementation of a secure auction server", IEEE Tran. on Software Engineering, 22(5), pp. 302–312, 1996.

[3] O. Goldreich, M. Micali, A. Wigderson, How to play any mental game, Proc. 19th ACM Symp. on Theory of Computing, 1987, pp. 218–229.

[4] M. Harakavy, J. D. Tygar and H. Kikuchi, "Electronic auctions with private bids", 3rd USENIX Workshop on Electronic Commerce, pp. 61–73, 1999.

[5] M. Naor, "Bit Commitment using Pseudo-randomness", J. of Cryptology, 4, 1991.

[6] M. Naor and B. Pinkas, "Privacy preserving negotiation and computation", patent application, 1999.

[7] A. C. Yao, How to Generate and Exchange Secrets, Proc. of the 27th IEEE Symp. on Foundations of Computer Science, 1986, pp. 162–167.

[8] D. Boneh and M. Naor, "Timed commitments and timed signatures", Proc. Advances in Cryptology—Crypto '00, Springer-Verlag LNCS, 2000.

Although the invention has been shown and described in terms of specific embodiments, nevertheless various changes and modifications will be evident to those skilled in the art from the teachings of the invention. Such changes and modifications which do not depart from the spirit, scope and contemplation of the invention are deemed to fall within the purview of the claims.

What is claimed is:

1. A method for preserving the integrity of a negotiation conducted via a network, and using clients and/or servers, among a plurality of parties each of whom is making a private input during the negotiation and wherein a trusted entity acting as a center computers and outputs a value F of these inputs constituting the output of the negotiation comprising the steps of:

a) providing an architecture which includes a center A, and a plurality of participants $B_1, B_2, \ldots, B_n$, to engage in a negotiation during which all communications originating with a participant $B_i$ and transmitted to center A are exclusive;

b) secretly generating an input $x_i$ by each participant $B_i$;

c) publishing by the center A to each participant a commitment to K combinatorial circuits that compute F, where K is a security parameter;

d) transmitting by each participant $B_i$ to the center A a commitment $c_i$ to the value of $B_i$'s input $x_i$, where $c_i$ is an encryption of $x_i$;

e) responsive to receipt of the commitments of the participants, publishing by the center A to the participants the commitments received;

f) providing to each participant $B_i$ part of the K combinatorial circuits that the center A committed to, and requesting center A to open them, whereupon each participant $B_i$ can verify that the part of the circuits opened to participant $B_i$ computes a value F;

g) transmitting by each participant $B_i$ to center A its input $x_i$ and decryption data to enable center A to verify that $x_i$ corresponds to the transmitted commitment $c_i$;

h) computing by center A a value of F based on the inputs $x_i$ it received by using a part of the K combinatorial circuits not disclosed to the participants, and publishing the computed value of F to the participants; and i) transmitting to all participants a proof that the computed value of F was computed correctly, which proof can be verified by each participant using the published commitments while preventing a coalition of any one subset of participants from learning (i) anything which cannot be computed just from the output of the K combinatorial circuits and from their own inputs, and (ii) information about the inputs of the other users.

2. The method of claim 1 wherein step i is carried out using a value F' that is computed from the K combinatorial circuits using inputs $x_i$ and outputs j, Y of the computed value of F, F' outputs 1 if and only if X(j)=Y, and X(j)>=X(i) for every i different from j.

3. The method of claim 1 wherein interaction between each participant and center A is carried out using a secure two-party function evaluation protocol run between each participant, $B_i$ and center A, the input of $B_i$ being a value $x_i$ and the input of center A being a description of a function f so that at the end of the protocol, $B_i$ learns f(x), but no other information about f, and center A learns nothing about $x_i$, thereby, the input $x_i$ is a private input of $B_i$, and the function f is a private input of center A.

4. The method of claim 2 wherein the protocol is based on expressing f as a combinatorial circuit of gates over a preselected fixed base, and wherein the bits of the input are entered into input wires and are propagated through the gates so that a pseudo-random isomorphic transformation of the circuit is generated producing a "garbling" of the circuit.

5. A method for preserving the integrity of a negotiation conducted via a network, and using clients and/or servers, among a plurality of parties each of whom is making a private input during the negotiation and wherein a trusted entity acting as a center computers and outputs a value F of these inputs constituting the output of the negotiation comprising the steps of:

a) announcing by center A that it will compute F;
b) providing an architecture which includes a center A, and a plurality of participants $B_1, B_2, \ldots, B_n$, to engage in a negotiation during which all communications originating with a participant $B_i$ and transmitted to center A are exclusive;
c) constructing by center A K garbled circuits including gates having wire inputs and outputs that compute F;
d) choosing by center A a permutation of each wire input of the circuits;
e) publishing by center A to each participant $B_i$ tables of gates, and commitments to the permutations and the garbled values of the input wires;
f) secretly generating an input $x_i$ by each participant $B_i$;
g) transmitting to center A, for every input wire for every circuit corresponding to an input bit known to participant $B_i$, a commitment of the permuted value of the input bit:
h) responsive to receipt of the commitments of the participants, publishing by the center A to the participants the commitments received;
i) selecting by each participant $B_i$ a subset of the K garbled circuits that the center A committed to:
j) revealing by center A its commitments to the subset of the K garbled circuits, whereupon each participant $B_i$ can verify that the circuits revealed to participant $B_i$ computes value F;
k) verifying by participants that test circuits compute F;
l) transmitting by each participant $B_i$ to center A its input $x_i$ and decryption data to enable center A to verify that $x_i$ corresponds to the transmitted commitment in step g;
m) computing by center A a value of F based on the inputs $x_i$ it received by using circuits not in the subset disclosed to the participants, and publishing the computed value of F to the participants;
n) publishing by center A opened commitments and corresponding garbled inputs; and
o) transmitting to all participants a proof that the computed value of F was computed correctly, which proof can be verified by each participant using the published opened commitments and corresponding garbled inputs while preventing a coalition of any one subset of participants from learning (i) anything which cannot be computed just from the output of the K garbled circuits and from their own inputs, and (ii) information about the inputs of the other users.

6. The method of claim 5 including the further step of each participant submitting its input to a trusted third party who can open an input in the event a participant refuses to open its commitment in step 1.

7. The method of claim 5 including the further step of each participant being required to use an optional forced opening when making its commitment to its input thereby enabling center A to recover the committed value without the help of the participant making the commitment, if a participant is not willing to open the commitment.

8. The method of claim 5 including the further step of requiring each participant to back up it commitment financially.

9. A method for preserving the integrity of a negotiation conducted via a network, and using clients and/or servers, among a plurality of parties each of whom is making a private input during the transaction and wherein a trusted entity acting as a center computers and outputs a value F of these inputs constituting the output of the transaction comprising the steps of:

a) providing an architecture which includes a center A, and a plurality of participants $B_1, B_2, \ldots, B_n$, to engage in a transaction during which all communications originating with a participant $B_i$ and transmitted to center A are exclusive;
b) secretly generating an input $x_i$ by each participant $B_i$;
c) publishing by the center A to each participant a commitment to K secure circuits that compute F, where K is a security parameter;
d) transmitting by each participant $B_i$ to the center A a commitment $c_i$ to the value of $B_i$'s input $x_i$, where $c_i$ is an encryption of $x_i$;
e) responsive to receipt of the commitments of the participants, publishing by the center A to the participants the commitments received;
f) providing to each participant $B_i$ part of the K secure circuits that the center A committed to, and requesting center A to open them, whereupon each participant $B_i$ can verify that the part of the circuits opened to participant $B_i$ computes a value F;
g) transmitting by each participant $B_i$ to center A its input $x_i$ and decryption data to enable center A to verify that $x_i$ corresponds to the transmitted commitment $c_i$;
h) computing by center A a value of F based on the inputs $x_i$ it received by using a part of the K secure circuits not disclosed to the participants, and publishing the computed value of F to the participants; and
i) transmitting to all participants a proof that the computed value of F was computed correctly, which proof can be verified by each participant using the published commitments while preventing a coalition of any one subset of participants from learning (i) anything which cannot be computed just from the output of the K secure circuits and from their own inputs, and (ii) information about the inputs of the other users.

* * * * *